United States Patent [19]

Holmes

[11] 4,364,092

[45] Dec. 14, 1982

[54] TELEVISION SIGNAL GHOST DETECTOR

[75] Inventor: David D. Holmes, Chesterfield, N.J.

[73] Assignee: RCA Corporation, New York, N.Y.

[21] Appl. No.: 228,595

[22] Filed: Jan. 26, 1981

[30] Foreign Application Priority Data

Aug. 14, 1980 [GB] United Kingdom ............... 8026515

[51] Int. Cl.³ .............................................. H04N 5/21
[52] U.S. Cl. ..................................... 358/167; 358/905
[58] Field of Search ......................... 358/36, 167, 905

[56] References Cited

U.S. PATENT DOCUMENTS 3,681,695 8/1972 Cease .................................. 455/137
3,935,536 1/1976 Kimura ............................... 358/905
3,956,585 5/1976 Butler ................................. 358/905

Primary Examiner—Michael A. Masinick
Attorney, Agent, or Firm—E. M. Whitacre; P. J. Rasmussen; W. B. Yorks

[57] ABSTRACT

A television signal ghost detector is provided which acquires a component of a ghost signal when one is present, after which the ghost signal component is tracked, thereby providing a continuous indication of the presence of the ghost signal and its delay with respect to the main television signal. In the television receiver, a training signal contained within the received television signal is applied to a variable delay line. When the television signal is contaminated by a ghost signal, the training signal will be followed by a ghost of itself. When the delay of the variable delay line is correct, the delayed training signal at the output of the delay line will be in time coincidence with the training signal ghost at the input of the delay line. A coincidence detector detects this condition, after which time the delay of the delay line is controlled to maintain the coincident condition during subsequent receptions of the training signal. The delay of the delay line is a measure of the delay of the ghost signal with respect to the main television signal. When the delay of the delay line is incorrect, and the coincident condition is not established, the delay of the delay line is varied until the coincident condition occurs.

5 Claims, 5 Drawing Figures

TELEVISION SIGNAL GHOST DETECTOR

This invention relates to television signal processing systems, and in particular, to systems which detect the presence and time location of a ghost television signal with respect to the main television signal.

Television receivers have long been plagued by interference resulting from the reception of reflected and delayed versions of the signals which the receiver is tuned to receive. These interfering signals are generally of a lower intensity and different phase than the directly received signals, and usually appear as shadow images of the desired image. Their appearance has given rise to the term "ghost" for these signals.

Ghost signals frequently occur in television receivers located in cities, where signal reflection from nearby buildings is common. With the advent of cable TV systems, the problem of ghost signal reception has intensified. The cable TV system can also receive reflected signals. Furthermore, mismatches of terminations in the cable TV transmission equipment often result in the generation of ghost signals within the cable TV system itself.

Numerous techniques have been proposed for eliminating ghost signals within the television receiver. Virtually all of these techniques utilize the common principle of delaying the main signal so that it is in time coincidence with the ghost signal. The delayed main signal is then attenuated so that its amplitude is the same as that of the ghost signal. This signal is then inverted to produce what is known as pseudo-ghost signal: a signal that is a complement of the ghost signal. The pseudo-ghost signal is then added to the received signal to cancel the ghost signal.

The first step in the generation of the pseudo-ghost signal is to identify the presence of the ghost signal, and its delay, or location in time, with respect to the main signal. In accordance with the principles of the present invention, a television signal ghost detector is provided which acquires a component of a ghost signal when one is present, after which the ghost signal component is tracked, thereby providing a continuous indication of the presence of the ghost signal and its delay with respect to the main television signal. In the television receiver, a training signal contained within the received television signal is applied to a variable delay line. The training signal is a signal with known characteristics. When the television signal is contaminated by a ghost signal, the training signal will be followed by a replica of the training signal, which is a ghost of the training signal. When the delay of the variable delay line is correct, the training signal at the output of the delay line will be in time coincidence with the training signal ghost at the input of the delay line. A coincidence detector detects this condition, after which time the delay of the delay line is controlled to maintain the coincident condition during subsequent receptions of the training signal. The delay of the delay line is a measure of the delay of the ghost signal with respect to the main television signal.

When the delay of the delay line is incorrect, and the aforedescribed coincident condition is not established, the delay of the delay line is varied until the coincident condition occurs.

Figure 1:
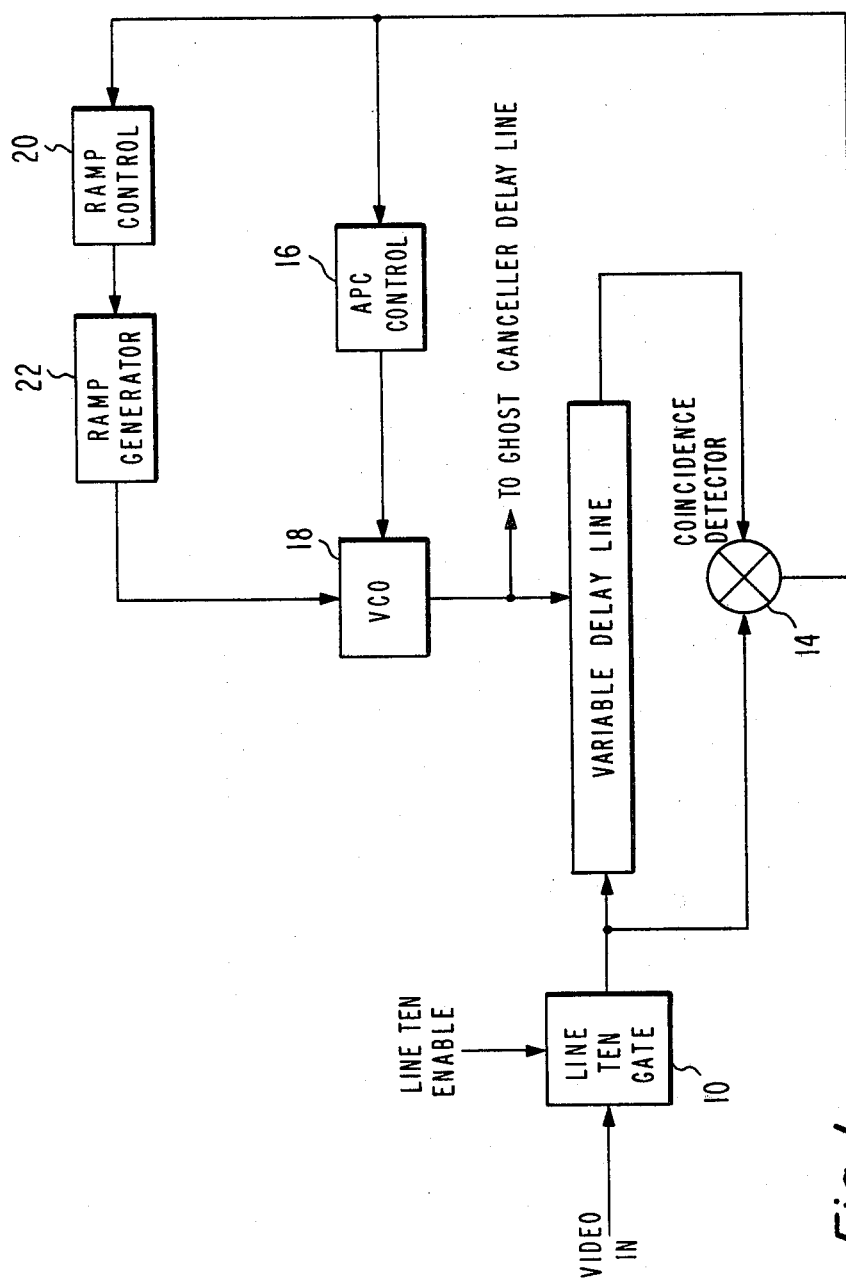
FIG. 1 illustrates, in block diagram form, a television signal ghost detector constructed in accordance with the principles of the present invention.

Referring to FIG. 1, a television signal ghost detector circuit is shown which uses a variable delay line 12. A video signal is applied to a line ten gate 10. The line ten gate will apply only line ten of the video signal to the delay line 12 and a coincidence detector 14. Line ten is the first full line in the video signal after the broad vertical and equalizing pulse interval, and normally contains a horizontal sync pulse followed by no video information. In this embodiment, the line ten horizontal sync pulse is used as a training signal for the ghost detector. When the television receiver is receiving a delayed ghost signal, a ghost of the sync pulse will appear in the blank line interval after the desired sync pulse. The circuit of FIG. 1 will search for and acquire such a ghost signal component within a delay range determined by the delay of the delay line.

In the embodiment illustratively shown in FIG. 1, the delay line 12 may comprise a CCD delay line having, for example, 70 elements. The CCD delay line is clocked by a voltage controlled oscillator (VCO) with a frequency range of 7 to 14 MHz. This provides a variable delay in the range of 5-10 microseconds. Other combinations of delay line elements and clock frequencies may also be used. For example, an 80 element delay line driven by a 5-15 MHz clock would provide a variable delay in the range of 5.33-16 microseconds.

A coincidence detector 14 has inputs coupled to the input and the output of the delay line 12, and its output is applied to an automatic phase control (APC) circuit 16 and a ramp control circuit 20. The output of the ramp control circuit 20 is coupled to a ramp generator 22, and the outputs of the APC control circuit 16 and the ramp generator 22 are coupled to the VCO 18. The output signal of the VCO 18 is applied to the clock input of the delay line 12.

When the applied video signal contains no ghost signal, or the delay line is being clocked at a frequency which establishes an incorrect delay for an existent ghost signal, the concidence detector 14 produces no output and the ramp control circuit 20 will cause the ramp generator to produce a ramp signal. The ramp signal will cause the VCO output signal to vary over its 7-14 MHz range, thereby changing the delay time of the delay line. Ghost searching will continue in this manner until a ghost is acquired.

A ghost is acquired when the sync signal at the output of the delay line is in time coincidence with the sync signal ghost at the input of the delay line. Upon acquisition, the coincidence detector produces a signal which causes the ramp control circuit to stop the ramp generator at its present ramp voltage level. The coincidence detector signal also activates the APC control circuit, which then assumes control of the VCO. The APC control circuit will change the VCO frequency as necessary so that the delay of the delay line is changed to follow any changes in the delay of the ghost with respect to the line ten sync signal (i.e., the training signal).

Figure 5:
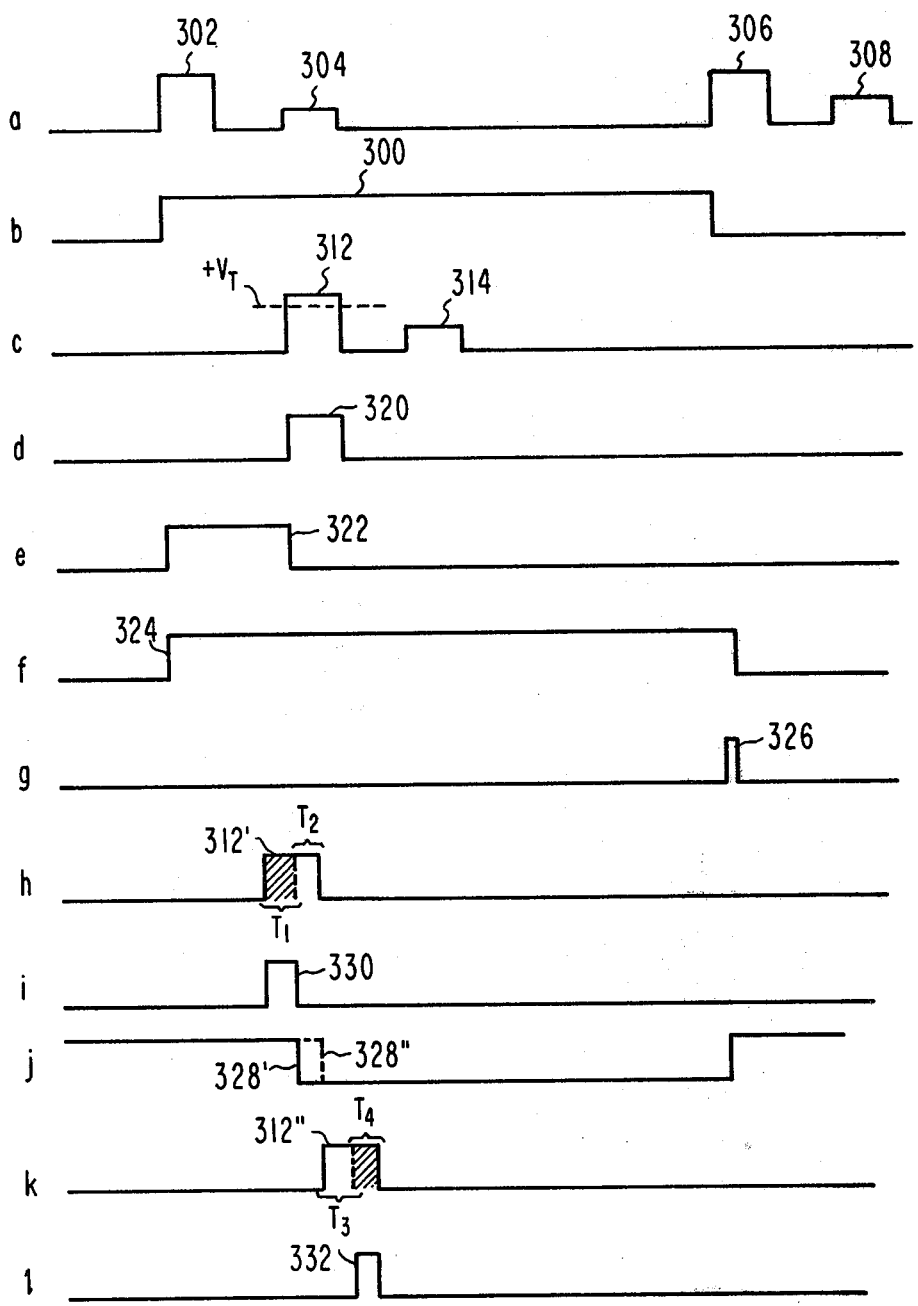
FIG. 5 illustrates waveform used to explain the operation of the ghost detector of FIGS. 2 and 4.

Waveforms illustrating the operation of the ghost detector of FIG. 1 are shown in FIG. 5. FIG. 5a shows the sync pulse 302 of line ten, followed by a ghost of the sync signal 304. Line ten ends prior to the line eleven sync pulse 306, which is also followed by a ghost pulse 308. The line ten gate 10 of FIG. 1 is opened for the duration of an enabling pulse 300, shown in FIG. 5b. The training sync pulse 302 and the following ghost pulse 304 are applied to the delay line 12. When the delay line delays the signal by the time interval between the horizontal sync pulse 302 and the ghost pulse 304, the output of the delay line will appear as illustrated by waveform 5c, referenced in time to the waveform of FIG. 5a. Since the delayed sync pulse 312 appears at the output of the delay line at the same time as the ghost pulse 304 is applied to the input of the delay line, a coincident condition will occur, causing the coincidence detector 14 to produce an output pulse 320, as shown in FIG. 5d. The coincidence pulse 320 causes the ramp control circuit 20 to stop the ramp generator 22. Control of the VCO 18 is then assumed by the APC control circuit 16, which will track the training signal ghost during subsequent line ten intervals.

Figure 2:
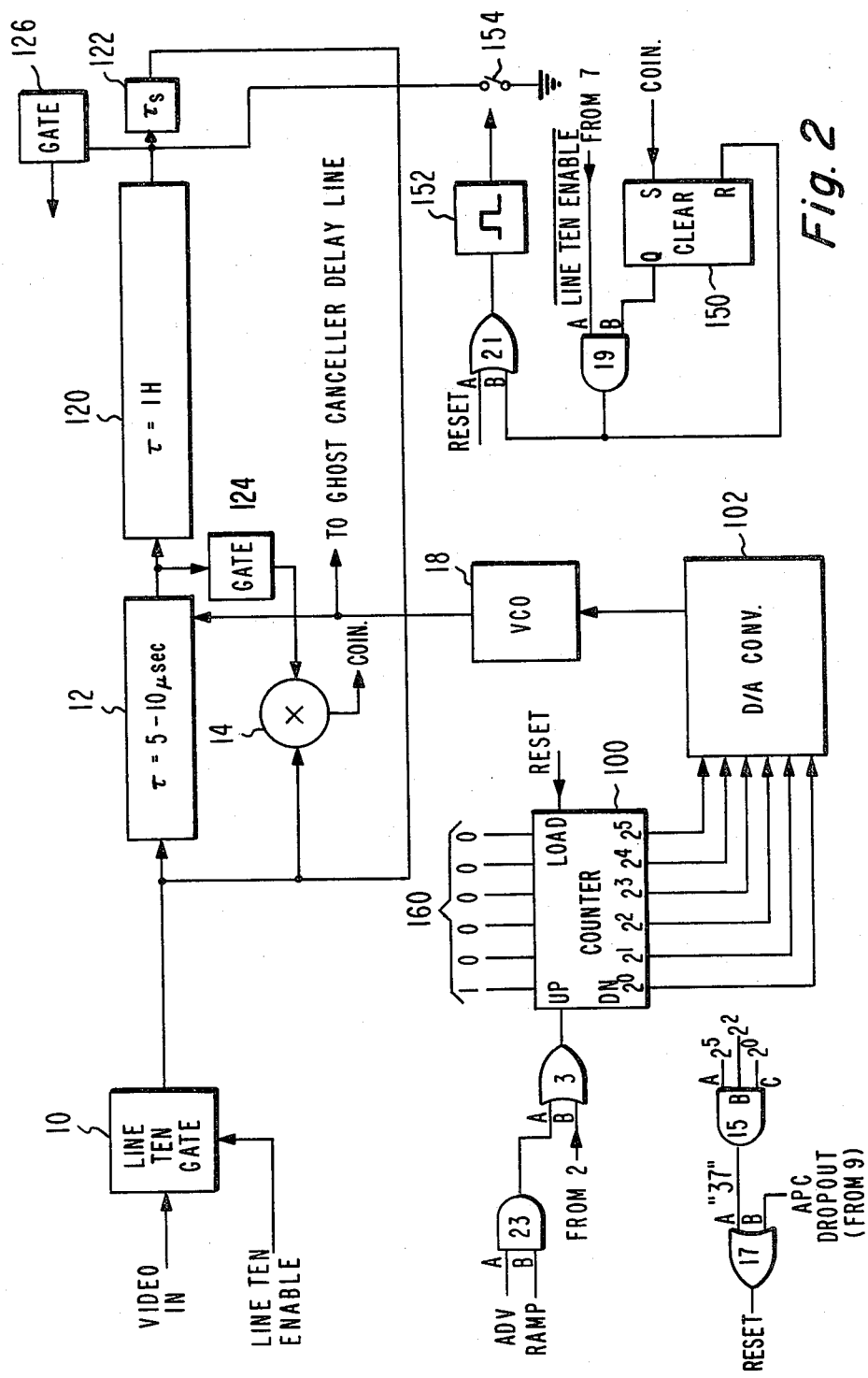
FIG. 2 illustrates, in block diagram form, a ghost detector in which the delay of a delay line is varied to determine the delay of the training signal ghost with respect to the training signal.
Figure 3:
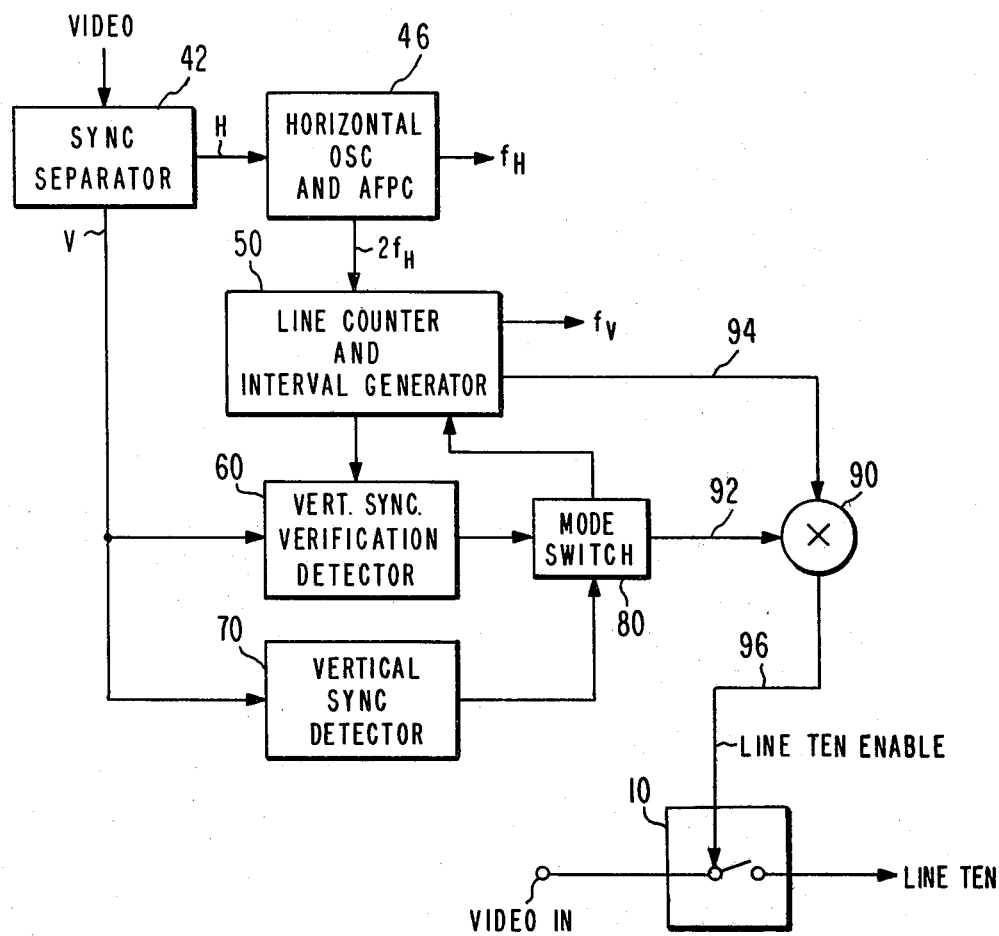
FIG. 3 illustrates, in block diagram form, a system suitable for applying a training signal and its ghost to the detector of FIG. 2.
Figure 4:
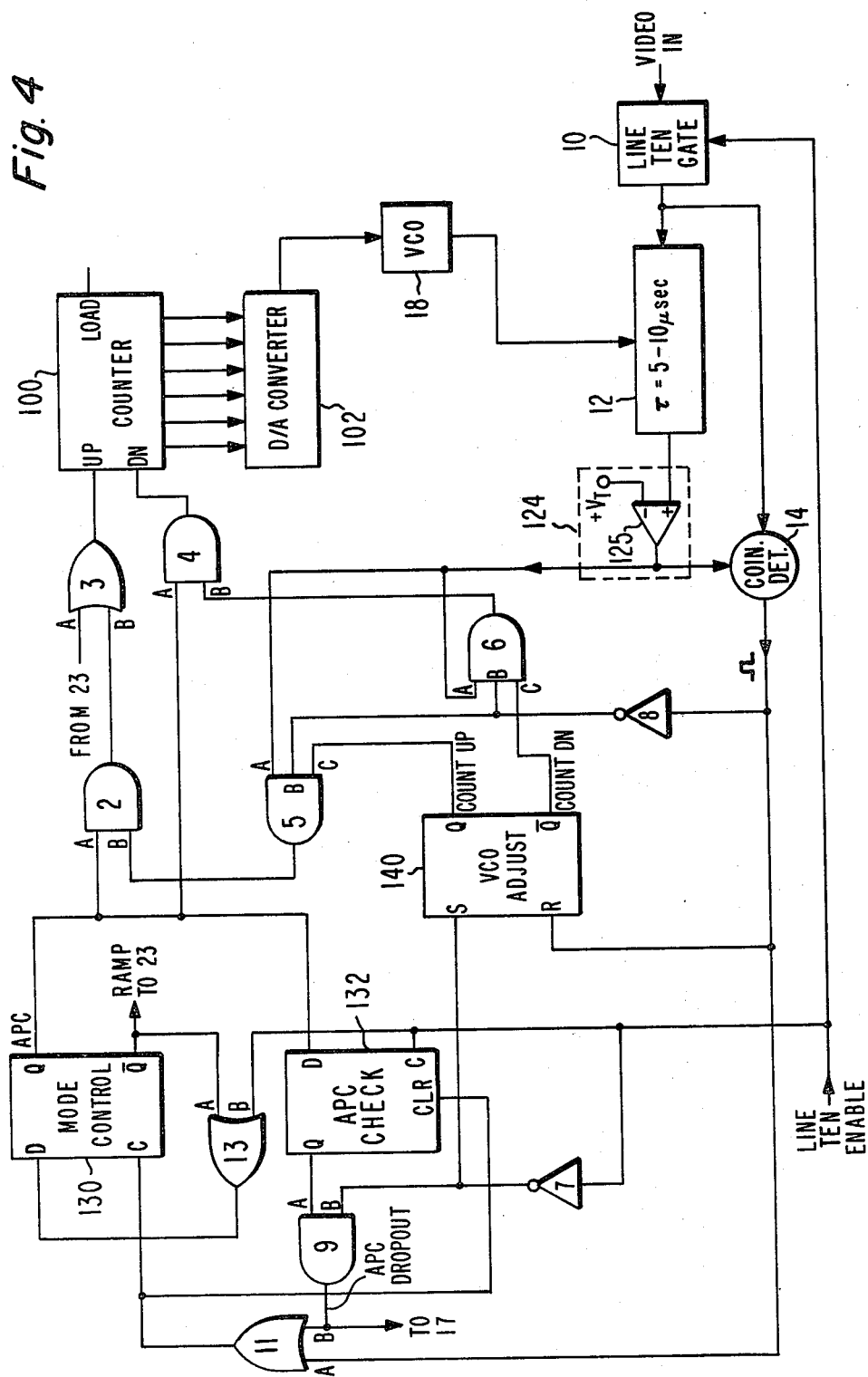
FIG. 4 illustrates, in block diagram form, a system which tracks a ghost signal after the ghost signal is acquired.

A more detailed embodiment of the ghost detector of FIG. 1 is shown in FIGS. 2, 3 and 4. In FIG. 2, the video signal and a line ten enable signal are applied to the line ten gate 10. The output of the line ten gate 10 is coupled to the variable delay line 12 and the coincidence detector 14. The output of the variable delay line 12 is coupled to the inputs of a sync pulse gate 124 and a 1H delay line 120. The sync pulse gate 124 will pass only the line ten sync pulses to the exclusion of any ghost pulses, and its output is coupled to the second input of the coincidence detector 14. The 1H delay line 120 delays signals applied to its input by the time duration of one horizontal line. The output of the 1H delay line 120 is coupled to the input of a second sync pulse gate 126 and the input of a short delay line 122. The output of the second sync pulse gate 126 produces an ADVANCE pulse (ADV) in response to a line ten sync pulse at its input, which is applied to the A input of an AND gate 23. The output of the short delay line 122 is coupled to the input of the variable delay line 12.

The output of AND gate 23 is coupled to the A input of an OR gate 3, the output of which is coupled to the "UP" input of an Up/Down counter 100. The Up/Down counter 100 has a "Down" input, and a "Load" input which may be pulsed to load the input data shown at 160 into the counter. The outputs of the counter are $2^0, 2^1, 2^2, 2^3, 2^4$ and $2^5$, which are coupled to a digital-to-analog converter 102. The D/A converter 102 produces a control voltage for the VCO 18, the output of which is used to clock the variable delay line 12. The $2^0$, $2^2$ and $2^5$ outputs of the counter 100 are also coupled to the inputs of an AND gate 15, the output of which is coupled to the A input of an OR gate 17. The output of OR gate 17 produces a "Reset" signal, which is applied to the "Load" input of the counter 100, and to the A input of an OR gate 21. The output of the OR gate 21 is coupled to the input of a monostable multivibrator 152, the output of which is coupled to apply a control signal to a switch 154. The switch 154 is normally open, and is coupled between the output of the 1H delay line 120 and a point of reference potential (ground).

In FIG. 4, various elements of FIG. 2 are again shown, and their description will not be repeated. The sync pulse gate 124 of FIG. 2 is shown in greater detail in FIG. 4. The sync pulse gate comprises a comparator 125 having inputs coupled to the output of the variable delay line 12 and a threshold voltage $+V_T$. The comparator 125 produces an output signal whenever the signal at the output of the variable delay line 12 exceeds the threshold voltage level $+V_T$, as shown in FIG. 5c. The sync pulse gate 126 of FIG. 2 may be constructed in a like manner.

In FIG. 4, the output of the coincidence detector 14 is coupled to the input of an inverter 8, the "Reset" input R of a VCO adjust flip-flop 140, and the A input of an OR gate 11. The line ten enable signal is applied to the input of an inverter 7, the "Clock" input C of an APC Check flip-flop 132, and the B input of an OR gate 13. The output of OR gate 11 is coupled to the clock input C of a Mode Control flip-flop 130 and the "Clear" input Clr of APC Check flip-flop 132. The Q output of the Mode Control flip-flop 130 produces an APC mode signal, which is applied to the A inputs of two AND gates 2 and 4, and to the "Data" input D of flip-flops 132. The $\overline{Q}$ output of the Mode Control flip-flop 130 produces a Ramp mode signal, which is applied to the A input of OR gate 13, and to the B input of AND gate 23 of FIG. 2. The output of OR gate 13 is coupled to the D input of the Mode Control flip-flop 130. The Q output of the APC Check flip-flop 132 is coupled to the A input of an AND gate 9, the output of which is coupled to the B input of of OR gate 11, and the B input of OR gate 17 in FIG. 2.

The inverted line ten enable signal at the output of the inverter 7 is applied to the B input of AND gate 9, the "Set" input S of VCO Adjust flip-flop 140, and input A of an AND gate 19 in FIG. 2. The Q output of the VCO Adjust flip-flop 140 provides a "Count Up" signal, which is applied to the C input of an AND gate 5. The $\overline{Q}$ output of flip-flop 140 provides a "Count Down" signal, which is applied to the C input of an AND gate 6. The inverted coincidence signal at the output of the inverter 8 is applied to the B inputs of AND gates 5 and 6, and the output of the sync pulse gate 124 is coupled to the A inputs of gates 5 and 6. The output of AND gate 5 is coupled to the B input of AND gate 2, and the output of AND gate 6 is coupled to the B input of AND gate 4. The output of AND gate 2 is coupled to the B input of OR gate 3, and the output of AND gate 4 is coupled to the "Down" input of the counter 100.

In FIG. 2, the coincidence signal from the coincidence detector 14 is applied to the "Set" input S of a Clear flip-flop 150. The Q output of flip-flow 150 is coupled to the B input of AND gate 19, the output of which is coupled to the B input of OR gate 21, and to the "Reset" input R of Clear flip-flop 150.

An arrangement for generating the line ten enable signal is shown in FIG. 3. This arrangement includes a vertical count-down configuration as described in U.S. Pat. No. 3,899,635. Briefly, the configuration includes a sync separator 42 responsive to the video signal for producing horizontal and vertical sync signals at outputs H and V. The horizontal sync signals are applied to a horizontal oscillator and AFPC circuit 46, which produces an output signal at the horizontal scanning frequency $f_H$. The horizontal oscillator and AFPC circuit 46 also produces an output signal having a frequency which is twice the horizontal scanning frequency, $2f_H$. The $2f_H$ signal is applied to a line counter and interval generator circuit 50. This circuit counts the half line periods of the $2f_H$ signal, and applies a vertical interval signal to a vertical sync verification detector circuit 60 over a range of counts during which the vertical sync signal is expected to occur. If the vertical sync signal from the sync separator occurs during this interval, the detector 60 switches a mode switch 80 to indicate a synchronized condition. The mode switch 80 applies the synchronization indication signal to the line counter and interval generator 50, which produces a vertical sync signal $f_v$ during the interval.

If the vertical sync verification detector 60 does not receive a vertical sync signal during the predicted interval, the mode switch is switched to an out-of-sync mode. In this mode, a vertical sync detector 70 examines the V output of the sync separator until a vertical sync pulse is identified. When a vertical sync pulse is identified, the vertical sync detector 70 conditions the mode switch to reset the counter in the line counter and interval generator 50, which reestablishes the proper synchronization. The mode switch is subsequently reset to indicate the synchronized condition.

When the mode switch 80 is set to indicate a synchronized operating condition, a synchronization indication signal is applied to a coincidence detector 90 by way of a conductor 92. The line counter and interval generator 50 produces a pulse on a conductor 94 whenever the counter indicates that line ten is being received (e.g., counts 18 and 19 of the $2f_H$ signal). The line ten indication pulse is applied to the coincidence detector 90 by way of a conductor 94, which produces a line ten enable signal whenever line ten is received during an in-sync condition. The line ten gate is closed for this interval. In the event that an out-of-sync condition occurs, the signal on conductor 92 is not present, and the line ten enable signal is not produced. This is because the line ten pulse on conductor 94 is unreliable during an out-of-sync condition.

The operation of the arrangement of FIGS. 2 and 4 proceeds as follows. Initially, the Mode Control flip-flop 130 is reset to produce a "high" Ramp mode signal and a "low" APC mode signal. The high Ramp mode signal conditions AND gate 23 for reception of ADVANCE signals. The counter 100 is loaded to a count of one, which, by way of the D/A converter 102, causes the VCO to operate at one extreme of its range of clock frequencies. The delay line 12 is now providing a delay corresponding to one extreme of its range of delay. For purposes of illustration, it will be assumed that the delay line 12 is providing a delay of 5 microseconds in this initial condition.

It will first be assumed that the applied video signal contains no ghost signal, or that a ghost signal occurs outside the detectable delay range of 5-10 microseconds. In either case, coincidence will not be established. The line ten signal will be gated to the variable delay line 12 and pass through it. Thereafter, the line ten signal is applied to the 1H delay line 120. When the line ten sync signal appears at the output of the 1H delay line 120, the sync pulse gate 126 is triggered and applies an ADVANCE pulse to the counter 100 by way of AND gate 23 and OR gate 3. The counter is advanced one count, the count is converted to a new VCO control signal, and the VCO reduces the clock frequency to increase the delay of the delay line 12. It will be assumed that one count corresponds to a delay change of 140 nanoseconds, resulting in a new delay of 5.14 microseconds. While the VCO frequency is changing, the line ten information is effectively stored in the 1H delay line 120 and the short delay line 122. The delay $\tau_s$ of the short delay line is sufficient to allow the VCO 18 to stabilize at its new clock frequency before the line ten information is reapplied to the input of the variable delay line 12.

As the line ten signal exits from the short delay line 122, it is reapplied to the coincidence detector 14 and the variable delay line 12. The signal is delayed by the new delay time of the variable delay line. When the line ten sync pulse appears at the output of the variable delay line 12, it is applied to the 1H delay line 120 and the sync pulse gate 124. The sync pulse is passed by the sync pulse gate 124 and applied to the coincidence detector 14, which senses a coincident condition between the line ten sync pulse and its ghost signal, which trails the sync pulse by the delay time of the variable delay line 12, if one is present. If no coincident condition is detected, the line ten signal again is stored by the 1H delay line 120 and the short delay line 122, and the appearance of the line ten sync pulse at the output of the 1H delay line 120 again increments the counter 100 by way of the sync pulse gate 126 and gates 23 and 3. The line ten signal is then reapplied to the variable delay line 12, the delay of which has again be incremented.

The recirculation cycle continues in this manner until a ghost pulse has been detected by the coincidence detector 14, or the variable delay line 12 has been incremented to its maximum delay time of 10 microseconds. In the latter case, the counter in the illustrated example will hold a count of 36. The line ten sync pulse at the output of the 1H delay line 120 will increment the counter to a count of 37, which will enable the inputs of AND gate 15. The gate 15 will produce a "Reset" pulse at the output of OR gate 17, which will trigger the monostable multivibrator 152 by way of OR gate 21. The monostable multivibrator 152 will then close switch 154 for a time duration that is at least equal to the total delay of the three delay lines (e.g., 10 microseconds, plus 1H, plus $\tau_s$). The line ten signal will be removed from the recirculating loop by switch 154 and its ground connection. The loop will now be ready to receive a new line ten signal when the monostable multivibrator returns to its stable condition and opens switch 154.

The "Reset" pulse is also applied to the "Load" input of the counter 100, which initializes the counter by loading the data at inputs 160 into the counter. The variable delay line 12 is now clocked at its initial delay condition of five microseconds.

It will now be assumed that the line ten signal includes a ghost pulse 304 within the detectable delay range of 5-10 microseconds relative to the training pulse 302 as shown in FIG. 5a. The line ten signal will be recirculated by the delay line loop until the variable delay line 12 reaches a delay setting at which the sync pulse at its output is coincident with the ghost signal at its input. The coincidence detector 14 will then produce a coincidence pulse 320, as shown in FIG. 5d.

As shown in FIG. 4, the coincidence pulse will be conducted to the clock input of flip-flop 130 by OR gate 11. Since the $\overline{Q}$ output of the flip-flop is high at this time, a high signal will be conducted to the D input of the flip-flop 130 by OR gate 13, permitting the coincidence pulse to set the flip-flop 130 to its APC mode. The "RAMP" signal at the $\overline{Q}$ output of the flip-flop will go low, which disables AND gate 23 in FIG. 2, preventing any additional ADVANCE pulses from reaching the counter. The coincidence pulse will also set the Clear flip-flop 150, thereby enabling input B of AND gate 19. If coincidence was detected at a count other than count one of the counter, the inverted line ten enable signal at the A input of the AND gate 19 will also be high, and the gate 19 will produce a high signal at its output. This high signal will trigger the monostable multivibrator 152, closing switch 154 and clearing the line ten signal from the recirculating delay line loop. The output signal of AND gate 19 is also applied to the "Reset" input of flip-flop 150, which resets the flip-flop.

The counter 100 is now controlling the VCO 18 so that the variable delay line 12 is providing a delay substantially equal to that of the detected ghost pulse with respect to the line ten sync pulse. The VCO clock signal may now be used to clock a similar variable delay line in a ghost cancelling system, as described in copending U.S. patent application Ser. No. 228,593, now allowed, entitled "TELEVISION GHOST CANCELLATION SYSTEM." If the ghost pulse is present in the same location during the next line ten signal, coincidence should be detected on the first pass through the variable delay line 12, because the variable delay line 12 is providing the proper delay for immediate detection. The ghost detector is now conditioned to operate in the APC mode to continuously track the ghost pulse, as described below.

When the next line ten signal is applied to the ghost detector, coincidence will be detected during the first transition through the variable delay line 12, if the ghost signal is in substantially the same position relative to the sync pulse as it was during the previous field. The line ten enable signal, which gates the line ten signal into the detector, appears as shown in FIG. 5b. The leading edge of this signal will set the APC check flip-flop 132, since the D input of the flip-flop is receiving the high APC signal from the Mode Control flip-flop 130. The Q output of the APC Check flip-flop 132 will go high as shown by waveform 322 in FIG. 5e. At the time of coincidence, coincidence pulse 320 will be applied to OR gate 11, and its high-going output at this time is applied to the "Clear" input of flip-flop 32. This will reset flip-flop 132, as shown by waveform 322 of FIG. 5e. The coincidence pulse will also clock the Mode Control flip-flop 130, which will remain in the APC mode, because the high line ten enable signal is applied to the D input by way of OR gate 13.

If the ghost signal has moved substantially or disappeared, a coincidence pulse will not be produced by the coincidence detector 14. The APC Check flip-flop 132 will remain set during the entire line ten enable interval, as shown by waveform 324 in FIG. 5f. At the end of this interval, the line ten enable signal 306 will go low, as shown in FIG. 5b, and the output of inverter 7 will go high. A high signal will be applied to the B input of AND gate 9, which, together with the high signal from the APC Check flip-flop 132, will cause the gate 9 to produce an "APC Dropout" signal at its output, as shown by waveform 326 in FIG. 5g. The APC Dropout signal performs three functions. First, the signal is applied to the clock input of the Mode Control flip-flop 130 by OR gate 11. The output of OR gate 13 will now be low, because the Ramp signal and the line ten enable signal at its inputs are now low. This low signal is applied to the D input of flip-flop 132, permitting the APC Dropout signal to clock the flip-flop to its rest condition. The APC mode is cancelled, and the system is in its searching Ramp mode. The APC Dropout signal is also applied to the "Clear" input of the APC Check flip-flop 132, resetting the flip-flop and terminating the APC Dropout signal. Finally, the APC Dropout signal 326 is also applied to the B input of OR gate 17 in FIG. 2, which produces a "Reset" signal at the output of the gate to reload the counter 100 to its initial condition and clear the line ten information from the delay line loop.

Ghost signal tracking is provided during the APC mode of operation as shown in FIG. 4 with reference to FIG. 5a, 5d, and 5h–5l. The VCO Adjust flip-flop 140 is reset by each coincidence pulse 320, as shown by waveforms 328' and 328" in FIG. 5j, which represent the Q output of the flip-flop. At the end of each line ten enable signal 300, flip-flop 140 is set by the inverted line ten enable signal at the output of inverter 7. These control signals for the VCO Adjust flip-flop 140 are applied to its "Reset" and "Set" inputs, respectively. When the VCO Adjust flip-flop 140 is set, a "Count Up" signal is applied to the C input of AND gate 5. When the flip-flop 140 is in its reset state, a "Count Down" signal is applied to the C input of AND gate 6.

If the delay of the ghost signal 304 increases from one line ten signal to the next so that the delayed sync pulse at the output of the variable delay line and the sync pulse gate 124 appears prior to the ghost pulse at the variable delay line input, the two signals at the inputs of the coincidence detector 14 will be related in time as shown by ghost pulse 304 of FIG. 5a and delayed sync pulse 312' of FIG. 5h. The two pulses will not be coincident during time T1 of FIG. 5h, but will be coincident for time T2. During time T1, the delayed line ten sync pulse will be present at the A input of AND gate 5, the Count Up signal at its C input will be high, and the output of inverter 8 (an inverted coincidence signal) will be high. AND gate 5 will therefore produce a high output signal 330 during time T1, as shown in FIG. 5i. This signal will be gated to the "UP" input of the counter 100 by AND gate 2 and OR gate 3, which will increment the counter 100 to decrease the frequency of the VCO clock and increase the delay of the variable delay line 12. When the next line ten signal is applied to the ghost detector, the delayed line ten sync pulse and the ghost signal will be more fully in coincidence if the ghost delay time has not changed.

During time T2 of delayed sync pulse 312', coincidence occurs and the coincidence detector will produce a coincidence pulse. The coincidence pulse will disable AND gates 5 and 6 by applying a low signal to their B inputs by way of inverter 8. The coincidence pulse will also reset the VCO Adjust flip-flop 140, as shown by waveform edge 328' in FIG. 5j. At the end of the concidence pulse of time T2, the delayed line ten sync pulse will no longer be present at the A inputs of AND gates 5 and 6, which will continue to disable these gates. If the delay of the ghost signal decreases from one line ten interval to another, so that the delay of the delay line is too long, the relative time position of the ghost pulse 304 and the delayed line ten sync pulse 312" will appear as shown in FIGS. 5a and 5k. Coincidence between the two signals will only occur for time T3 of pulse 312", at which time the VCO Adjust flip-flop 140 will be reset as shown by dashed line 328" of FIG. 5k, thereby providing a Count Down signal to the C input of AND gate 6. At the end of the coincident period T3, the inverted coincidence signal at the B input of AND gate 6 will go high and the delayed line ten sync pulse at the output of sync pulse gate 124 will continue to be applied to the A input of the gate. AND gate 6 will thus produce a pulse 332, shown in FIG. 5l, for the remaining duration T4 of the delayed line ten sync pulse. The pulse 332 will be conducted to the "Down" input of the counter 100 by AND gate 4, thereby decrementing the counter, increasing the frequency of the VCO clock signal, and decreasing the delay of the variable delay line 12. The next line ten ghost signal will thus be more fully in coincidence with the delayed line ten sync pulse if its time delay has not changed during the intervening field time.

If necessary, an even number of inverters may be coupled between the output of the sync pulse gate 124 and the A inputs of AND gates 5 and 6 to prevent the occurrence of a "race" condition between the delayed line ten sync pulse and the inverted coincidence pulse at the B inputs of gates 5 and 6.

What is claimed is:

1. In a television receiver, including a source of video signals which may be contaminated with a ghost signal, said video signal including a component subject to use as a training signal, a television ghost detector system comprising:
    means responsive to said video signals and having an output for passing a portion of said video signals which includes said training signal, and a ghost of said training signal when a ghost signal is present;
    a variable delay line having an input coupled to receive said portion of said video signals and an output, and a control signal input, and responsive to a control signal for controlling the delay imparted to said video signal portion by said delay line over a range of delay times;
    a coincidence detector having a first input coupled to the input of said delay line and a second input coupled to the output of said delay line, and an output at which a coincidence signal is produced in response to the application of said training signal to said second input in time coincidence with the application of its ghost signal to said first input; and
    means having an input coupled to the output of said coincidence detector and an output coupled to said control signal input of said delay line, for providing a control signal to said delay line so as to establish its delay at a delay within said range of delay times.

2. The arrangement of claim 1, wherein said control signal providing means comprises:
    a voltage controlled oscillator having in input, and an output coupled to said control signal input of said variable delay line for providing an oscillatory signal thereto;
    a ramp generator having an input, and an output coupled to the input of said voltage controlled oscillator for providing a frequency control signal for said voltage controlled oscillator in response to an input signal; and
    a ramp control circuit having an input coupled to the output of said coincidence detector and an output coupled to the input of said ramp generator for controlling the magnitude of said frequency control signal.

3. The arrangement of claim 2, wherein said ramp control circuit further comprises means for varying the magnitude of said frequency control signal prior to the reception of one of said video signal portions by said variable delay line, and means responsive to said coincidence signal for inhibiting the variation of the magnitude of said frequency control signal.

4. The arrangement of claim 2 or 3, wherein said control signal providing means further comprises an APC circuit having an input coupled to the output of said coincidence detector and an output coupled to said voltage controlled oscillator, and responsive to said coincidence signal for controlling the frequency of said oscillatory signal so as to condition said variable delay line for the production of substantially full concidence between said training signal and its ghost signal at the inputs of said coincidence detector.

5. The arrangement of claim 1, wherein said control signal providing means includes means operable in a first, search mode, for providing a control signal which incrementally changes the delay of said delay line over said range of delay times so as to impart different delays to sequentially received ones of said video signal portions, and operable in a second, track mode, which is initiated by said coincidence signal, for providing a control signal which is varied as required to maintain substantially complete time coincidence of said training signal and its ghost signal at the inputs of said coincidence detector.

* * * * *